United States Patent Office 3,262,810
Patented July 26, 1966

3,262,810
GLASS CLOTH
James K. Campbell, Midland, Mich., assignor to Dow Corning Corporation, Midland, Mich., a corporation of Michigan
No Drawing. Filed July 20, 1962, Ser. No. 211,437
4 Claims. (Cl. 117—126)

This invention relates to a woven glass cloth of improved abrasion resistance in the presence of hot corrosive gases.

It is generally necessary to apply a finish to glass cloth in order to increase the abrasion resistance of the fibers. Otherwise, excessive abrasion occurs during movement of the cloth. Various silicone coatings have been used for some time in order to improve the abrasion resistance of glass cloth. Although these coatings reduce the abrasion at high temperature, they have not been satisfactory at high temperatures in the presence of corrosive gases. It is important that a coating with a high abrasion resistance in the presence of hot corrosive gases be developed in order to permit the use of glass cloth in such an environment. One such use for glass cloth is in filter bags for filtering hot gases produced by various industrial processes. It is essential that the glass fibers in these bags be coated in order to improve their abrasion resistance. A high abrasion resistance is needed because of the movement of the bag in the gas stream and during the emptying procedure. It is essential that this coating be resistant to attack by hot corrosive gases in order that the coating is not removed, thereby decreasing the abrasion resistance of the fibers. One corrosive component that is present in the hot gases produced by many industrial processes is ferrous sulfite. Applicant has invented a woven glass cloth which has improved abrasion resistance in the presence of hot corrosive gases (in particular ferrous sulfite containing gases).

It is an object of this invention to provide a coated woven glass cloth with improved abrasion resistance in the presence of hot corrosive gases. In particular, it is an object to provide a woven glass cloth filter bag with improved abrasion resistance in the presence of ferrous sulfite containing gases.

These objects are obtained by an article of manufacture comprising a woven glass cloth, the fibers in said cloth being coated with from .1 to 10 percent by weight based on the weight of the glass cloth of a copolymeric siloxane having a degree of substitution of from 1.9 to 2.5 inclusive organic radicals per silicon atom, said siloxane containing halogenated aryl radicals selected from the group consisting of $X_aC_6H_{5-a}$ and $X_bC_{12}H_{9-b}$ radicals, wherein X is selected from the group consisting of chlorine and bromine, $a$ has a value of from 1 to 5 inclusive and $b$ has a value of from 1 to 7 inclusive, the remaining organic radicals in said siloxane being selected from the group consisting of monovalent hydrocarbon and $$C_nF_{2n+1}CH_2CH_2—$$

radicals, wherein $n$ has a value of from 1 to 8 inclusive, the halogenated aryl radicals being present in said siloxane in an amount so that there are at least 0.05 X atoms per silicon atom.

The siloxane coating is a copolymer containing both halogenated aryl radicals and other organic radicals. It is essential that the copolymeric siloxane have sufficient halogenated aryl radicals so that there are at least .05 halogen atoms per silicon atom in the siloxane copolymer. The halogenated aryl radicals are of the type $X_aC_6H_{5-a}$ and $X_bC_{12}H_{9-b}$. X is either chlorine or bromine, $a$ has a value of from 1 to 5 inclusive and $b$ has a value of from 1 to 7 inclusive. The $X_bC_{12}H_{9-b}$ radical is a halogenated xenyl radical, the term xenyl being employed to designate the radical $C_6H_5C_6H_4—$ which is also known as the biphenyl radical.

The halogenated phenyl radicals can contain a total of from 1 to 5 chlorine and/or bromine atoms attached directly to the benzene nucleus, and the chlorine and/or bromine atoms may be spaced in any manner around the benzene nucleus. For example, they may be ortho-, meta-, para-, symmetrical, asymmetrical in relationship to the silicon atom to which the benzene nucleus is attached. The halogenated xenyl radical can contain a total of from 1 to 7 chlorine and/or bromine radicals and these atoms can be spaced in any manner around the xenyl nucleus. These halogenated aryl radicals can be substituted on a silicon atom in a $RSiO_{1.5}$, $R_2SiO$ or a $R_3SiO_{.5}$ siloxane unit, or on the silicon atoms or any combination of these units, wherein R represents a halogenated aryl radical. The halogenated phenyl radicals are preferred, and the preferred halogen atom is chlorine.

The proportion of halogenated aryl radicals in the copolymeric siloxanes is such that there are at least .05 halogen atom per silicon atom. The remainder of the radicals in the siloxane are either monovalent hydrocarbon or $C_nF_{2n+1}CH_2CH_2—$ radicals. There is no particular advantage obtained when there are more than four inclusive halogen atoms per silicon atom, and it is preferred that there are from .05 to .5 halogen atom per silicon atom.

The remainder of the radicals in the siloxane are either monovalent hydrocarbon or $C_nF_{2n+1}CH_2CH_2—$ radicals. Specific examples of monovalent hydrocarbon radicals which are operative in this invention are alkyl radicals such as methyl, ethyl, t-butyl and octadecyl; alkenyl radicals such as vinyl, allyl and butadienyl; cycloalkyl radicals such as cyclobutyl, cyclopentyl and cyclohexyl; cycloalkenyl radicals such as cyclopentyl and cyclohexyl; aryl radicals such as phenyl and xenyl; aralkyl radicals such as benzyl and xenyl and alkaryl radicals such as tolyl. Specific examples of $C_nF_{2n+1}CH_2CH_2—$ radicals are $CF_3CH_2CH_2—$, $C_3F_7CH_2CH_2—$ and $C_8F_{17}CH_2CH_2—$. Phenyl radicals and alkyl radicals such as methyl are preferred.

While all of the organic radicals, other than the halogenated aryl radicals, can be any of the above described radicals, it is preferred that at least 30 percent of the total organic radicals be methyl, and at least some of any remaining organic radicals be phenyl. The best results are obtained when 80 percent or more of the total organic radicals are methyl and at least some of any remaining organic radicals are phenyl.

It is essential that the copolymeric siloxane have a degree of substitution of from 1.9 to 2.5 inclusive total organic radicals per silicon atom. The siloxane copolymer can contain $R'SiO_{1.5}$, $R'_2SiO$, and $R'_3SiO_{.5}$ units in such ratios that the desired degree of substition is obtained.

R' in these formulae can be any of the previously defined halogenated aryl, monovalent hydrocarbon or a $$C_nF_{2n+1}CH_2CH_2—$$

radical. It is preferred that the copolymeric siloxane have a degree of substitution of from 1.98 to 2.2.

These copolymeric siloxanes can be prepared by several well known methods. For example, a halogenated aryl chlorosilane can be prepared and then cohydrolized with other silanes to produce the desired copolymeric siloxane. Alternatively, a phenyl or xenyl siloxane can be halogenated directly by contacting it with chlorine or bromine. Many siloxane copolymers containing halogenated aryl radicals are described in U.S. Patent 2,599,-984 (Fletcher and Hunter).

The siloxane coating is best applied to the glass cloth by first preparing an emulsion of the silicone and then applying the emulsion to the fibers. While this emulsion can be cationic, anionic or non-ionic, it is preferred that it be non-ionic. Methods of emulsifying this type of copolymeric siloxane are well known in the art. Alternatively, the siloxane can be applied to the fibers in a solvent bath. Solvents such as xylene and toluene are satisfactory.

The treating bath can be applied to the glass cloth in any convenient manner such as by spraying, dipping, brushing or flooding. In general, the cloth is usually dipped into the bath until the fibers have become thoroughly wet and is thereafter removed and dried. It is generally desirable to remove excess material from the cloth by using squeeze rollers. The coating can then be cured by heating. In general, the siloxanes can be cured by heating from 1 to 20 minutes at temperatures of from 100 to 200° C.

In general, this treatment causes a siloxane pickup of from .1 to 10 percent by weight based upon the weight of the cloth. The amount of pickup depends primarily upon the concentration of the treating bath. Preferably, the total pickup should range from .5 to 5 percent by weight. The best results are obtained when there is a siloxane pickup of about 1 to 2.5 percent by weight.

As illustrated in Example 1, the coated glass cloth has extremely good abrasion resistance at very high temperature in the presence of ferrous sulfite. This glass cloth is also extremely resistant to attack by various other corrosive agents. Filter bags made of this glass cloth are excellent for use in filtering corrosive gases. The abrasion resistance of the glass fibers in such bags is greatly increased by the coating of this invention.

The following examples are illustrative only and should not be construed as limiting the invention which is properly delineated in the appended claims.

EXAMPLE 1

This example demonstrates the superior abrasion resistance to ferrous sulfite at elevated temperature of a chlorophenylsiloxane coating.

The following materials were used to prepare treating baths at a concentration of 7 percent by weight solids (based on the weight of total solution):

A. A siloxane copolymer containing about 6 mol percent mono-(dichlorophenyl)siloxane, about 5 mol percent phenylmethylsiloxane, about 75 mol percent dimethylsiloxane and about 14 mol percent trimethylsiloxane.
B. Phenylmethylsiloxane.
C. Trifluoropropylmethylsiloxane.

Some of the treating baths used xylene as a solvent and some of the baths were water emulsions. Samples of continuous filament glass fabric were dipped into each of the treating baths, dried and heated at 350° F. for 5 minutes. In each case, the fabric picked up between 1.5 and 2.5 percent solids based on the weight of the fabric. Each sample was then dipped into a slurry containing about 1 percent by weight ferrous sulfite, removed and heated at 400° F. for varying lengths of time.

The abrasion resistance of the samples was determined by continuously flexing the sample on a Stoll Flex Abrader until failure. A one-inch-wide strip of fabric was used. Four pounds tension was maintained during flexing on the 1/8" rod around which the fabric was wrapped. The vertical head pressure on the sample was 2 pounds. The number of flexes for each sample are set forth in Table I.

TABLE I

| | Treating Material | Initial | Flex Life | |
| --- | --- | --- | --- | --- |
| | | | 1 hr. at 400° F. | 6 hrs. at 400° F. |
| 1 | A in xylene | 452 | 510 | |
| 2 | B in xylene | 729 | 274 | |
| 3 | C in xylene | 656 | 315 | |
| 4 | A in water | 497 | 497 | 505 |
| 5 | B in water | 781 | 573 | 326 |

EXAMPLE 2

Glass cloth with superior abrasion resistance is obtained when any of the following siloxanes are substituted for the siloxane used in No. 4 of Table I and the procedure of Example 1 is followed.

*Composition of siloxane in mol percent*

(1) $25(CH_3)_3SiO_{.5}$, $75(ClC_6H_4)(CH_3)SiO$
(2) $5(Cl_7C_{12}H_2)SiO_{1.5}$, $85(CH_3)_2SiO$, $10(CH_3)_3SiO_{.5}$
(3) $10(CH_3)_3SiO_{.5}$, $10(ClC_6H_4)SiO_{1.5}$, $70(CH_3)_2SiO$, $5(CH_2=CH)(CH_3)SiO$, $5(C_6H_5)_2SiO$
(4) $10(CH_3)_3SiO_{.5}$, $10(Cl_4C_6H)SiO_{1.5}$, $70(CH_3)_2SiO$, $10(CF_3CH_2CH_2)(CH_3)SiO$
(5) $25(CH_3)_3SiO_{.5}$, $10(Cl_2C_6H_3)SiO_{1.5}$, $50(C_6H_{11})(CH_3)SiO$, $15(C_6H_5)(CH_3)SiO$
(6) $10(ClC_6H_4)SiO_{1.5}$, $80(CH_3)_2SiO$, $10(CH_3)(C_{18}H_{37})SiO$
(7) $10(ClC_6H_4)_2SiO$, $75(CH_3)_2SiO$, $10(CH_3)_3SiO$, $5(C_6H_5)(CH_3)SiO$
(8) $10(Br_2C_6H_3)(CH_3)SiO$, $5(C_6H_5)(CH_3)SiO$, $75(CH_3)_2SiO$, $10(CH_3)_3SiO_{.5}$
(9) $10(Cl_2C_6H_3)(CH_3)SiO$, $10(CF_3CH_2CH_2)(CH_3)SiO$, $60(CH_3)_2SiO$, $15(CH_3)_3SiO$, $5(C_6H_5)(CH_3)SiO$.

That which is claimed is:
1. An article of manufacture comprising a woven glass cloth, the fibers in said cloth being coated with from .1 to 10 percent by weight based on the weight of the glass cloth of a copolymeric siloxane having a degree of substitution of from 1.9 to 2.5 inclusive organic radicals per silicon atom, said siloxane containing halogenated aryl radicals selected from the group consisting of $X_aC_6H_{5-a}$ and $X_bC_{12}H_{9-b}$ radicals, wherein X is selected from the group consisting of chlorine and bromine, $a$ has a value of from 1 to 5 inclusive and $b$ has a value of from 1 to 7 inclusive, the remaining organic radicals in said siloxane being selected from the group consisting of monovalent hydrocarbon and $C_nF_{2n+1}CH_2CH_2—$ radicals, wherein $n$ has a value of from 1 to 8 inclusive, the halogenated aryl radicals being present in said siloxane in an amount so that there are at least 0.05 X atom per silicon atom.

2. The article of manufacture of claim 1 wherein the halogenated aryl radicals are of the formula $Cl_aC_6H_{5-a}$ and the remaining organic radicals are monovalent hydrocarbon radicals.

3. An article of manufacture comprising a woven glass cloth, the fibers in said cloth being coated with from .1 to 10 percent by weight based on the weight of the glass cloth of a copolymeric siloxane having a degree of substitution of from 1.9 to 2.5 inclusive organic radicals per silicon atom, said siloxane containing $Cl_aC_6H_{5-a}$ radicals wherein $a$ has a value of from 1 to 5 inclusive, the remaining organic radicals in said siloxane being monovalent hydrocarbon radicals, the $Cl_aC_6H_{5-a}$ radicals being present in said siloxane in an amount so that there are from 0.05 to 4 inclusive chlorine atoms per silicon atom, at least 30 percent of the organic radicals being methyl and at least some of any remaining organic radicals being phenyl.

4. An article of manufacture comprising a woven glass cloth filter bag, the fibers in said filter bag being coated with from .5 to 5 percent by weight based on the weight of the glass cloth of a copolymeric siloxane having a degree of substitution of from 1.98 to 2.2 inclusive organic radicals per silicon atom, said siloxane containing $Cl_aC_6H_{5-a}$ radicals, wherein $a$ has a value of from 1 to 4 inclusive, the remaining organic radicals in said siloxane being monovalent hydrocarbon radicals, the $Cl_aC_6H_{5-a}$ radicals being present in said siloxane in an amount so that there are from .05 to .5 inclusive chlorine atoms per silicon atom, at least 80 percent of the total organic radicals being methyl and at least some of any remaining organic radicals being phenyl.

References Cited by the Examiner

UNITED STATES PATENTS

| | | | |
|---|---|---|---|
| 2,258,219 | 10/1941 | Rochow | 117—126 |
| 2,531,571 | 10/1950 | Hyde | 117—126 |
| 2,599,984 | 6/1952 | Fletcher et al. | 252—40.7 |
| 2,608,499 | 8/1952 | Straka | 117—126 |
| 2,805,731 | 3/1955 | Kron | 55—517 |
| 2,911,427 | 11/1959 | Brown | 117—126 |

OTHER REFERENCES

G. Lowrie, Fairs, "High Efficiency of Fibre Filter . . ." Trans. Instn. Chem. Engr., December 1958, vol. 36, pp. 477–486.

MURRAY KATZ, *Primary Examiner.*

RICHARD D. NEVIUS, *Examiner.*

W. L. SOFFIAN, *Assistant Examiner.*